(12) United States Patent
Weimer et al.

(10) Patent No.: US 9,937,692 B2
(45) Date of Patent: Apr. 10, 2018

(54) METHOD FOR THE MANUFACTURE OF REINFORCED MATERIALS AND MATERIAL THAT CAN BE OBTAINED FROM THIS METHOD

(71) Applicant: Airbus Defence and Space GmbH, Ottobrunn (DE)

(72) Inventors: Christian Weimer, Munich (DE); Patricia Parlevliet, Munich (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 444 days.

(21) Appl. No.: 14/561,492

(22) Filed: Dec. 5, 2014

(65) Prior Publication Data
US 2015/0158280 A1 Jun. 11, 2015

(30) Foreign Application Priority Data

Dec. 5, 2013 (DE) .................. 10 2013 018 158

(51) Int. Cl.
| | | |
|---|---|---|
| *B32B 37/06* | (2006.01) | |
| *B32B 37/04* | (2006.01) | |
| *B32B 37/14* | (2006.01) | |
| *B32B 37/18* | (2006.01) | |
| *B29C 65/00* | (2006.01) | |
| *B29C 65/02* | (2006.01) | |
| *B29L 31/30* | (2006.01) | |
| *B29C 65/14* | (2006.01) | |
| *B29C 65/16* | (2006.01) | |
| *B29C 65/36* | (2006.01) | |
| *B29L 31/60* | (2006.01) | |

(52) U.S. Cl.
CPC .............. *B32B 37/06* (2013.01); *B29C 65/02* (2013.01); *B29C 66/727* (2013.01); *B29C 66/7254* (2013.01); *B29C 66/72525* (2013.01); *B29C 66/73921* (2013.01); *B32B 37/04* (2013.01); *B32B 37/142* (2013.01); *B32B 37/182* (2013.01); *B29C 65/14* (2013.01); *B29C 65/16* (2013.01); *B29C 65/167* (2013.01); *B29C 65/3612* (2013.01); *B29C 65/3676* (2013.01); *B29C 66/474* (2013.01); *B29C 66/71* (2013.01); *B29C 66/721* (2013.01); *B29C 66/7212* (2013.01); *B29C 66/73771* (2013.01); *B29C 66/73773* (2013.01); *B29C 66/91943* (2013.01); *B29L 2031/3076* (2013.01); *B29L 2031/608* (2013.01)

(58) Field of Classification Search
CPC ....... B32B 37/06; B32B 37/04; B32B 37/182; B32B 37/142; B29C 65/02; B29C 66/72525; B29C 66/7254; B29C 66/727; B29C 66/73921

See application file for complete search history.

(56) References Cited

U.S. PATENT DOCUMENTS

| | | | | |
|---|---|---|---|---|
| 5,589,515 A | | 12/1996 | Fusco et al. | |
| 5,832,594 A | * | 11/1998 | Avila | B29C 65/364 |
| | | | | 29/432 |
| 6,106,646 A | * | 8/2000 | Fairbanks | B29C 66/8322 |
| | | | | 156/253 |
| 2009/0218724 A1 | * | 9/2009 | Weber | B29C 65/3616 |
| | | | | 264/236 |

FOREIGN PATENT DOCUMENTS

| | | | |
|---|---|---|---|
| DE | 102005024408 A1 | 11/2006 | |
| WO | 9312344 A1 | 6/1993 | |
| WO | WO 9312344 A1 * | 6/1993 | ......... B29C 65/0672 |
| WO | 9829243 A1 | 7/1998 | |
| WO | 2007012353 A1 | 2/2007 | |

OTHER PUBLICATIONS

Machine Translation of WO 9312344 A1; Jun. 1993.*
European Patent Office, European Search Report for European Patent Application No. 14196374 dated Feb. 12, 2016.

* cited by examiner

*Primary Examiner* — Daniel McNally
(74) *Attorney, Agent, or Firm* — Lorenz & Kopf, LLP

(57) ABSTRACT

A method for the manufacture of reinforced core composites, comprises: inserting of a pin into a foamed core material or a filled honeycomb-shaped core material, wherein the pin and the core material contain a thermoplastic polymer, or a mixture of thermoplastic polymers; the pin is heated such that as the pin is inserted the core material softens or melts at the point of insertion; and/or the core material is heated at the point of insertion such that the core material softens or melts.

7 Claims, No Drawings

METHOD FOR THE MANUFACTURE OF REINFORCED MATERIALS AND MATERIAL THAT CAN BE OBTAINED FROM THIS METHOD

CROSS-REFERENCE TO RELATED APPLICATION

This application claims priority to German Patent Application No. 10 2013 018 158.5, filed Dec. 5, 2013, which is incorporated herein by reference in its entirety.

TECHNICAL FIELD

This application pertains to the design and manufacture of reinforcing elements penetrating the core composite in the thickness direction for purposes of reinforcing core composite structures.

An exemplary embodiment described herein is suitable for the reinforcement of core composite structures. Core composite structures usually contain a relatively thick core layer of low bulk density, e.g., of foamed material, or a honeycomb core structure formed from vertically running cells of hexagonal cross-section, and optional surface layers.

With the aid of this exemplary embodiment, the transverse properties (e.g., compressive and tensile stiffness and strength) at right angles to the plane of the core composite can be improved, as can the shear stiffness and strength in the plane of the core composite.

Moreover, since fewer different materials are used, the recyclability of the material is improved.

BACKGROUND

By virtue of their good ratio of stiffness and strength to density, composite materials, and in particular core composite structures, find a wide range of applications in the field of aircraft construction. Such composite materials, for example core composite structures, are generally formed from an upper and lower surface layer, or top layer, between which a layer of low bulk density (e.g., of foamed material or a honeycomb core structure, usually filled, formed from vertically running cells of hexagonal cross-section can be located to increase stiffness).

Foamed materials are of interest by virtue of their multi-functionality for application in core composites for large format structural components; e.g., in the field of aviation, and in particular, in component manufacture and in the field of enhanced component properties. For purposes of reinforcing the foam-based core composites, sewing techniques or pre-preg pinning techniques are usually employed, wherein fibres or threads can be inserted into hard foam components. After a resin infiltration process, the regions penetrated by the fibres then contribute to the mechanical reinforcement of the foamed material.

The fibres or threads inserted for reinforcement can take the form of so-called rovings, which consist of parallel running fibres. They can also take the form of threads that consist of twisted or plaited fibres.

In known sewing methods, a needle first punctures the foamed material and penetrates through the latter. At the same time the needle inserts a thread into the foamed material. During insertion into the foamed material, the thread extends parallel to and essentially over the entire length of the needle. The size of the puncture hole is thus determined by the needle diameter and the thickness of the thread.

After withdrawal of the needle from the foamed material or textile, a hole remains, the diameter of which is relatively large compared with the diameter of the inserted thread. The result is that after infiltration with a resin the hole area that is not filled with fibres is filled with resin. This can lead to increased weight of the finished component, which in aviation and space flight, is to be avoided.

DE 10 2005 024 408 A 1 describes the reinforcement of foamed materials by means of a knotting method, in which the needle firstly punctures the material that is to be reinforced (the foamed material), and only then, in the region of the lower face of the foamed material, picks up the semi-finished textile product, and in the following reverse movement pulls it through the punctured hole. In this manner, the hole diameter can be kept relatively small overall.

WO 2007/012353 describes a production method for the reinforcement of core materials for core composites, wherein a hole is firstly punctured in the core composite by means of a gripper, and by means of this gripper a reinforcing material is pulled into the core material. However, the bonding between the reinforcing material and core material can be improved further.

DETAILED DESCRIPTION

The following detailed description is merely exemplary in nature and is not intended to limit the embodiment or the application and uses of the embodiment. Furthermore, there is no intention to be bound by any theory presented in the preceding background of the embodiment or the following detailed description.

It is an object of the embodiment described herein to provide an improved core composite and a method for the manufacture of reinforced core composites, a core composite, and an aircraft with a core composite.

Embodiments described also relate to a manufacturing method, a tool, a sandwich structure, and an aircraft.

In accordance with an exemplary embodiment, there is provided a method manufacturing reinforced core composites, the method comprising: insertion of a pin into a foamed core material or a filled honeycomb-shaped core material wherein the pin and the core material contain a thermoplastic polymer, or a mixture of thermoplastic polymers; and the pin is heated such that as the pin is inserted, the core material softens or melts at the point of insertion; and/or the core material is heated at the point of insertion such that the core material softens or melts.

The core composites that can thus be obtained have greater stability. Moreover the pin bonds directly with the core material, since both the pin and the core material soften and bond together during the process. As the pin is inserted, some of the core material is displaced partially filling the adjacent pores and thus leads to a larger contact surface area between core material and pin, which in turn leads to increased stability.

Suitable thermoplastic polymers are, for example, polyetherimide, polyetheretherketone, polyamide, polyimide, polyethersulfone, polyurethane or polyvinylchloride, or mixtures of these. Polyamide, polyetherimide, polyetheretherketone, or mixtures of these, are preferred, e.g., mixtures of polyetherimide and polyetheretherketone in a weight ratio between 65:35 and 35:65. The expression "polymeric part" signifies the totality of all polymers contained in the respective material, e.g., of the pin, or core material.

In one embodiment the pin and the core material contain the same type or types of thermoplastic polymer(s). "Same type of thermoplastic polymer" signifies that while the type of plastic remains the same, the materials of the core and pin can, however, have different physical properties, e.g. molecular weights. This can be explained as follows: The pin contains, for example, a polyetherimide with a molecular weight of 50,000 g/mol, and the core material contains a polyetherimide with a molecular weight of 80,000 g/mol. The polymers are thus of the same type (polyetherimide), but have different molecular weights; they are therefore the same type of thermoplastic polymer.

Pin and/or core material can also contain mixtures of thermoplastic polymers. The same types of thermoplastic polymers are preferably deployed in each case. The mixture ratio within the core material and the pin can, however, differ.

This can be explained in the following, non-restrictive, examples. The pin contains, for example, a mixture of a polyetherimide with a molecular weight of 50,000 g/mol and a polyetheretherketone with a molecular weight of 70,000 g/mol in a mixture ratio of 50:50. The core material contains, for example, a mixture of a polyetherimide with a molecular weight of 80,000 g/mol and a polyetheretherketone with a molecular weight of 1,200,000 g/mol in a mixture ratio of 60:40. The polymers are thus of the same type (polyetherimide/polyetheretherketone), but have different molecular weights and weight ratios; they are therefore the same types of thermoplastic polymers.

The pin and the core material preferably contain the same thermoplastic polymer, or the same mixture of thermoplastic polymers. "The same thermoplastic polymer" signifies that the same plastic material is used for the pin and the core material. "The same mixture of thermoplastic polymers" signifies that the individual polymers contained in the mixture are the same, as is the mixing ratio.

In one embodiment the polymeric part of the pin and the core material contains at least 90% by weight in each case of the same thermoplastic polymer, or the same mixture of thermoplastic polymer. In a further embodiment the polymeric part of the core material contains 100% by weight of the same thermoplastic polymer or the same mixture of thermoplastic polymers, as the pin.

In a further embodiment the pin is fibre-reinforced. In a preferred embodiment the fibre-reinforced pin is a pultruded product. The pin is preferably comprised of the same thermoplastic polymer or the same mixture of thermoplastic polymers, as the core material and, optionally, of the fibres inserted for purposes of reinforcement. The thermoplastic polymers can be amorphous or semi-crystalline polymers.

The temperature to which the pin and/or the core material is heated at the point of insertion usually lies above the glass transition temperature $T_g$ of the thermoplastic polymer of the core material or the pin, respectively, determined by means of dynamic differential calorimetry in accordance with DIN 65467. In the case of semi-crystalline polymers, the temperature is normally not higher than the melting point $(T_m)+50°$ C. of the semi-crystalline polymer of the core material or the pin, respectively, determined by means of dynamic differential calorimetry in accordance with DIN 65467. In the case of amorphous polymers the temperature is normally not higher than the glass transition temperature $(T_g)+50°$ C. of the amorphous polymer of the core material or the pin, respectively, determined by means of dynamic differential calorimetry in accordance with DIN 65467.

Should the material have more than one glass transition temperature, then the lowest glass transition temperature is to be used for the above-cited range. Should the material have more than one melting temperature then the highest melting temperature is to be used for the above-cited range.

If the core material and the pin are heated, the temperature of the core material and the pin is normally selected from the above-cited ranges.

The cross-sectional area of the pin is usually not more than 35 mm$^2$. The pin can be e.g. round or oval, or can have corners. In one embodiment only the core material is heated. In this embodiment the pin is also heated indirectly by contact with the heated core material. In another embodiment the pin, and optionally the core material, is heated. In this embodiment the pin can be spiky in order to ease insertion into the core material.

In order to heat the core material locally the core material is advantageously reinforced with particles. These particles are preferably metallic particles. With metallic particles, induction heating can, for example, be used. But also heating by means of LEDs, lasers and electron beams is thereby facilitated.

Before the pin is inserted, a hole can optionally be drilled or punched into the core material. Such a hole is usually smaller than the pin that is inserted. "Smaller" denotes in this case, that not only is the cross-sectional area of the hole smaller than the cross-sectional area of the pin, but also that the cross-sectional area of the hole lies fully within the cross-sectional area of the pin. By means of such a hole, the quantity of core material that the pin displaces when inserted is reduced, which also leads to a reduced weight of the core composite structure. This is of particular advantage in aviation and space flight. Moreover in the case of pins with larger cross-sections, e.g. 20 mm$^2$ or more, the risk is reduced that softened or molten core material is ejected from the core, which material must be removed. The heating of the pin or the core material can, for example, take place by means of LEDs, lasers, electron beams, or induction. In the case of heating of the core material at the point of insertion, the volume of core material that is heated, preferably up to the above-cited temperature ranges, is not more than four times the volume that the pin occupies within the core material, and preferably not more than three times.

The pin can protrude above the core material, or can end flush with the core material. In the case of a pin that ends flush with the core material on both faces, the volume that the pin occupies within the core material corresponds to the volume of the pin. Should the pin protrude on one or both faces, the volume that the pin occupies within the core material corresponds to the volume of the pin that does not protrude above the core material.

The core composite structure can, in addition to the core material, preferably have surface layers of e.g. thermoplastic pre-pregs, thermosetting plastic pre-pregs, glass fibre or carbon fibre reinforced polymers, semi-finished textile products, aramide fibres, or polymeric material. The respective methods for bonding with the core material are known to the person skilled in the art. In one embodiment the core composite structure contains surface layers of a polymeric material. These surface layers are usually bonded by means of an adhesive film with the core material.

In a preferred embodiment, the surface layers contain the same thermoplastic polymer, or the same mixture of thermoplastic polymers, as the core material as the matrix. In a further preferred embodiment, the polymeric part of the surface layers consists of the same thermoplastic polymer, or the same mixture of thermoplastic polymers, as the polymeric part of the core material. In a particularly preferred embodiment, the polymeric part of the surface layers, the polymeric part of the core material, and the polymeric part of the pins consist of the same thermoplastic polymer, or the same mixture of thermoplastic polymers. As has already been stated above, in a preferred embodiment the pin is fibre-reinforced and consists of these fibres and the same thermoplastic polymer, or the same mixture of thermoplastic polymer, as the core material. Suitable surface layers are referred to above.

When using the same thermoplastic polymer, the adhesive film can optionally be omitted, and the surface layers are bonded directly with the core material; e.g., by means of heat transfer and diffusion bonding of the polymers.

Depending upon the hardness of the pin, insertion of the pin can take place very quickly; e.g., by means of an arrangement of ultrasound-activated press-fit devices. Here the pin is preferably not directly heated.

It should be noted that it is not necessary to have a supporting surface on which the whole core composite is supported during the process. It is sufficient if the core composite is supported only at the point at which the pin is inserted, and the core composite or the supporting surface is repositioned for purposes of inserting a pin at another point on the core composite. The material of this supporting surface is usually selected such that the pin cannot bond with the supporting surface (e.g., Teflon or metal).

The embodiment further concerns a reinforced core composite containing: a foamed or filled honeycomb-shaped core material, and pins within the core material; wherein the pin and the core material contain a thermoplastic polymer, or a mixture of thermoplastic polymers.

The preferred embodiment of the method are likewise preferred embodiment of the reinforced core composite, of the reinforced core composite that can be obtained from the method in accordance with an embodiment, and of the aircraft containing a reinforced core composite in accordance with an embodiment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for the manufacture of making reinforced core composites, the method comprising:
   inserting a pin into a foamed core material or a filled honeycomb-shaped core material, wherein the pin and the core material contain a thermoplastic polymer, or a mixture of thermoplastic polymers;
   and at least one of
   heating the pin such that as the pin is inserted the core material softens or melts at the point of insertion; and
   heating the core material at the point of insertion such that the core material softens or melts,
   wherein the core material is reinforced with particles that are located within the core material.

2. The method of claim 1, wherein the heating takes place by means of induction.

3. The method of claim 1, wherein the pin is fibre-reinforced.

4. The method of claim 1, wherein the pin is a pultruded product.

5. The method of claim 1, wherein
   the thermoplastic polymer, or the mixture of thermoplastic polymers, is selected from polyetherimide, polyetheretherketone, polyamide, polyimide, polyethersulfone, polyurethane or polyvinylchloride, or mixtures of these.

6. The method of claim 1, wherein the thermoplastic polymer, or the mixture of thermoplastic polymers, is selected from polyamide, polyimide, polyetheretherketone, or mixtures of these.

7. A method for making reinforced core composites, comprising:
   inserting a pin into a foamed core material or a filled honeycomb-shaped core material, wherein the pin and the core material contain at least one thermoplastic polymer; and
   heating the pin to soften or melt the core material at the point of insertion to soften or melt the core material, wherein the thermoplastic polymer is selected from polyetherimide, polyetheretherketone, polyamide, polyimide, and polyethersulfone,
   wherein the core material is reinforced with particles which are located within the core material.

* * * * *